(12) United States Patent
Stolz et al.

(10) Patent No.: US 8,190,504 B1
(45) Date of Patent: May 29, 2012

(54) CORPORATE PAYMENTS, LIQUIDITY AND CASH MANAGEMENT OPTIMIZATION SERVICE PLATFORM

(75) Inventors: Eckehard Stolz, Bregenz (AT); Cornelia Irrasch, Klagenfurt (AT); Bernd Moosbrugger, Burgberg (DE)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/978,065

(22) Filed: Dec. 23, 2010

(51) Int. Cl.
*G06Q 40/00* (2006.01)
(52) U.S. Cl. .................................... 705/36 R; 705/30
(58) Field of Classification Search .............. 705/10–44
See application file for complete search history.

(56) References Cited

U.S. PATENT DOCUMENTS

| | | | |
|---|---|---|---|
| 6,128,602 A | 10/2000 | Northington et al. | |
| 7,389,209 B2* | 6/2008 | Masiello et al. | 703/2 |
| 7,474,995 B2* | 1/2009 | Masiello et al. | 703/2 |
| 7,970,684 B1* | 6/2011 | Benda | 705/36 R |
| 7,979,339 B2* | 7/2011 | Claus et al. | 705/37 |
| 8,082,204 B2* | 12/2011 | Mittal et al. | 705/37 |
| 2003/0023533 A1* | 1/2003 | Tan | 705/36 |
| 2004/0039622 A1* | 2/2004 | Masiello et al. | 705/8 |
| 2006/0190371 A1* | 8/2006 | Almgren et al. | 705/35 |
| 2007/0156550 A1* | 7/2007 | Der Emde et al. | 705/35 |
| 2009/0157563 A1* | 6/2009 | Serbin et al. | 705/36 R |
| 2009/0254489 A1* | 10/2009 | Geller et al. | 705/36 R |

* cited by examiner

*Primary Examiner* — Frantzy Poinvil
(74) *Attorney, Agent, or Firm* — Brinks Hofer Gilson & Lione

(57) ABSTRACT

A corporate payment, liquidity, and cash management optimization service platform helps meet the need in corporate banking to leverage more of the value of the bank relationship with the corporation. The platform integrates into the supply chain processes of the corporate customer and may provide liquidity forecasting and optimization services. The platform provides a one-to-many model in which the bank serves many corporates with one system to save operating costs and gain economies of scale. In addition, the platform leverages existing bank services, while at the same time providing modular, configurable services in a secure, integrated solution.

24 Claims, 7 Drawing Sheets

| Modular Service: Treasury and Portfolio Management | 200 |
|---|---|
| Risk & Performance Management | 202 |
| Integrated Liquidity Forecasting | 208 |
| Liquidity Management Cockpit | 210 |
| Automated Liquidity Shortage Alerting | 212 |
| Automated Investment Proposals | 214 |
| Optimized Working Capital Usage | 204 |
| Cash Pooling and Automatic Balance Transfers | 216 |
| Overdraft Protection | 218 |
| Cost & Liquidity Optimized Account Routing | 220 |
| Direct Access Financial Instruments | 206 |
| Direct Money Market Access | 222 |
| FOREX Trading Platform | 224 |
| Hedging Tools and Strategies | 226 |

Figure 2

CORPORATE PAYMENTS, LIQUIDITY AND CASH MANAGEMENT OPTIMIZATION SERVICE PLATFORM

BACKGROUND OF THE INVENTION

1. Technical Field

This disclosure relates to corporate liquidity and cash management. In particular, this disclosure relates to aggregation and analysis of portfolios of account data in connection with liquidity prediction and simulation to help provide action proposals that help an entity achieve a desired liquidity position over a specified period of time.

2. Related Art

In the past, corporate interactions with banks tended to follow a non-centralized and non-optimized model of tangled banking flows between corporations (and their affiliates) and their financial institutions (e.g., their banks). In this model, each corporation (or affiliate) and each bank communicated in its own proprietary way using proprietary communication channels. The complexities and inefficiencies of this model were exacerbated by the significant number of corporations and affiliates, and the significant number of financial institutions with which the corporations and affiliates communicated.

More recently, there has been a transition to centralized payment flows and corporate treasury functions. This transition has happened on the corporate side, using a "payment factory." The payment factory is implemented and controlled by the corporation, and interfaces to the financial institutions using an inter-bank secured network (which may include Society for Worldwide Interbank Financial Telecommunication (SWIFT) transactions). This type of centralization provides the corporation with a single view of payment flows and cash positions for each affiliate. However, the centralization also causes banks to face new challenges in terms of corporations consolidating bank relationships, increasing price pressure, loss in transaction volume, margin erosion and loss of customers.

Accordingly, banks increasingly need to differentiate themselves by providing services addressing corporate needs and creating new value-added services for corporate customers. At the same time, the new services need to be oriented toward the value and services of the payment factories. Furthermore, segmentation of customers must be addressed by providing flexible services for large as well as mid-size corporations, and to leverage economies of scale by providing the services across many corporations.

SUMMARY

A corporate payment, liquidity, and cash management optimization service platform helps meet the need in corporate banking to leverage more of the value of the bank relationship with the corporation. The platform integrates into the supply chain processes of the corporate customer and may provide liquidity forecasting, optimization, and other services. The platform provides a one-to-many model in which the bank serves many corporates with one system to save operating costs and gain economies of scale. In addition, the platform leverages existing bank services, while at the same time providing modular, configurable services in a secure, integrated solution.

In one aspect, the platform implements a method for financial portfolio optimization. The method includes providing a processor and a memory in communication with the processor. Stored in the memory are a liquidity forecasting program and a financial data aggregation program. The financial aggregation program obtains and stores in the memory on a real-time, event driven, or other basis, financial data for a financial portfolio. The financial data may include, as examples, account identifiers, account balances, incoming cash-flow event identifiers, and outgoing cash-flow event identifiers.

The platform executes the liquidity forecasting program with the processor on the financial data to determine a liquidity analysis result. The liquidity analysis result may include a predicted cash position over a time period for the financial portfolio, with the liquidity analysis result stored in the memory. In addition, the platform stores in the memory a liquidity simulation program and a liquidity optimization goal. The platform executes the liquidity simulation program with the processor on the liquidity analysis result and the financial data to determine action proposals that move the liquidity analysis result toward the liquidity optimization goal, stores action proposals in memory, and displays the action proposals for review.

The regular acquisition of financial data feeds the liquidity forecasting and simulation programs. Acquisition may occur in real-time, at predetermined intervals, or as any change happens in any account in a portfolio, as examples. As a result, the bank may provide to the corporate customer a rapidly evolving and responsive liquidity forecast, with action proposals to help the corporate customer meet their liquidity goals. One benefit, for example, is that the liquidity analysis may be done immediately as changes happen to accounts in the financial portfolio, rather than being delayed by waiting for relatively slow events, such as monthly statements to arrive.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 2 shows a functional breakdown for a treasury and portfolio management service.

DETAILED DESCRIPTION

The systems and methods may be better understood with reference to the following drawings and description. The components in the figures are not necessarily to scale, emphasis instead being placed upon illustrating the principles of the invention. Moreover, in the figures, like referenced numerals designate corresponding parts throughout the different views.

Figure 1:
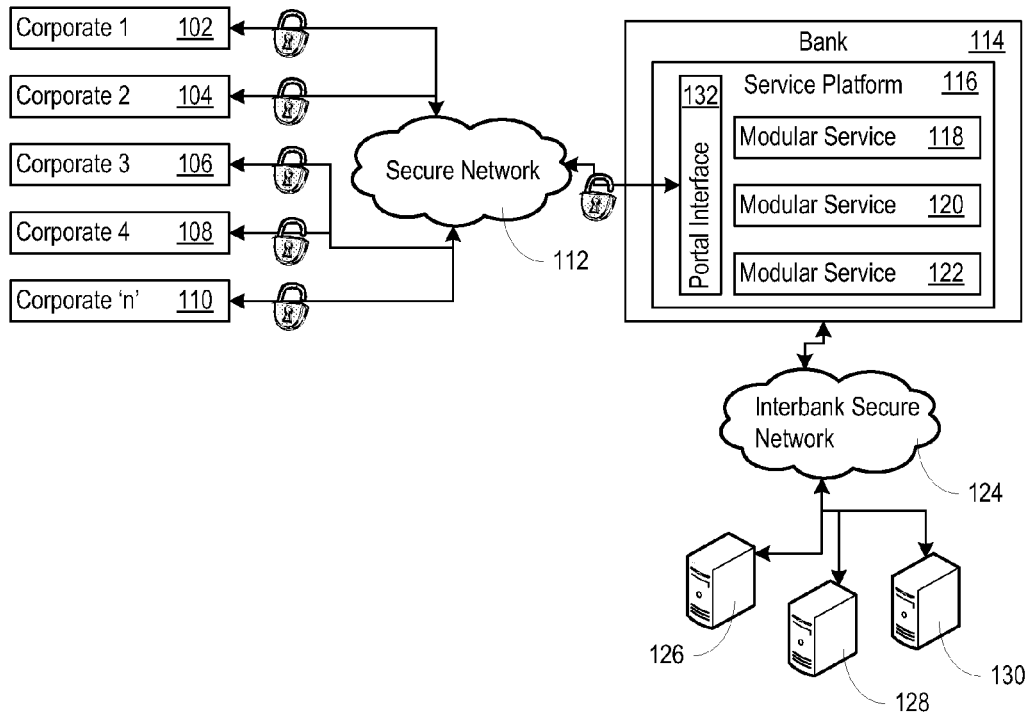
FIG. 1 shows a financial management architecture.

FIG. 1 shows a financial management architecture 100 ("architecture 100"). The architecture 100 connects any number of corporate entities and their affiliates (e.g., the corporate entities 102, 104, 106, 108, 110) through secure network(s) 112 to financial institutions (e.g., the bank 114). The bank 114 hosts a corporate payment, liquidity, and cash management optimization service platform 116 ("platform 116"). The service platform 116 implements any number of modular services (e.g., the modular services 118, 120, and 122). An interbank secure network 124 connects the bank 114 to other financial institutions 126, 128, and 130. The other financial institutions 126, 128, 130 may be other banks, stock exchanges, investment providers, or other financial institutions (or other sources of financial data).

The architecture 100 implements a many-to-one model in which the bank 114 may serve many corporations 102-110, thereby saving operating costs and gaining economies of scale. For the corporations 102-110, the architecture 100 provides an integrated solution giving the corporations 102-110 access to the modular services 118-122, and facilitating integrated access to all payment and account information. To that end, the platform 116 may implement a portal interface 132 (e.g., a web portal) into the platform 116 for access to any of the functionality described below. The secure networks 112 and 124 may be SWIFT networks, or other networks that provide secure network connections between the corporations 102-110 and the financial institutions 114, 126-130.

In other implementations, the platform 116 is implemented independently or outside of the bank and communicates with the bank 114 and corporates 102-110 to provide the modular services 118-120. The modular services 118-120 may vary widely. As one example, the modular service 118 may be a financial supply chain integration service, the modular service 120 may be a payment factory operations service, and the modular service 122 may be a treasury and portfolio management service. The platform 116 thereby provides one integrated platform to facilitate the bank 114 providing corporate bank services, and further provides the corporations 102-110 with seamless integrated access to all of the information about their the accounts in their financial portfolios.

More specifically, the financial supply chain integration service may tightly integrate payment processes with the financial supply chain processes of the corporations 102-110. To that end, the financial supply chain integration service may, with interface and file conversion functions, implement a secure interface for all corporate to bank information flows, with support for multiple message formats; may, with payment processing functions, provide centralized payment processing for increased predictability of cash flows while leveraging efficiencies for all corporate payments; and may, with corporate payment control functions, provide portal access to allow the corporations 102-110 to control their payments and cash positions, regardless of their banking relationships.

The payment factory operations service may provide centralized and cost-efficient payment operations. To that end, the payment factory operations service may, with matching and reconciliation functions, provide automated information on cash inflows and outflows, thereby reducing manual activities on the corporate side; may, with receivables management functions, integrate receivables management and related processes; may, with transaction cost optimizations, reduce payment flows, while leveraging value date gains and optimizing fees per payments; and may, with financial supply chain functions, integrate documents along the financial supply chain.

The treasury and portfolio management service may perform liquidity forecasting, simulation, analysis, alerting and other liquidity services as described in more detail below. To that end, the treasury and portfolio management service may, with risk and performance management functions, integrate liquidity forecasting, monitoring, and management; may, with optimized working capital usage functions, prevent sleeping capital and optimally use working capital in financial supply chain operations; and may, with direct access to financial instruments functions, direct real-time access to financial trading for the corporations 102-110.

FIG. 2 shows a functional breakdown of one implementation of a treasury and portfolio management service 200 ("service 200"). Within the service 200 are: risk and performance management functions 202, optimized working capital usage functions 204, and direct access to financial institutions functions 206. Additional, different, or fewer functions may constitute the treasury and portfolio management service 200.

Within the risk and performance management functions 202 exist: integrated liquidity forecasting functions 208, a liquidity management cockpit 210, automated liquidity shortage alerting functions 212, and automated investment proposal functions 214. The integrated liquidity forecasting functions 208 provide the corporations 102-110 with an on-demand liquidity forecast, based on regularly updated financial information (e.g., real-time account statements or event driven account changes), and integrating all available information on corporate cash flows, such as guaranteed value dates of payments or the historical customer credit scoring.

The liquidity management cockpit 210 provides a user interface through which the corporations 102-110 may manage cash peaks and shortages according to liquidity planning, to simulate planning options and to inherit simulations (e.g., on execution dates into the ERP system). The automated liquidity shortage alerting functions 212 initiate automatic system alerts for the corporations 102-110 when one or more accounts reach a pre-configured account balance or final account balance, optionally with respect to real-time balances. The automated investment proposal functions 214 provide action proposals for example for investment options to address excess cash accumulation, to reach liquidity goals, provide liquidity planning, or for any other aspect of account or liquidity management.

Within the optimized working capital usage functions 204 exist: cash pooling and automated balance transfer functions 216, overdraft protection functions 218, and cost and liquidity account routing functions 220. The cash pooling and automated balance transfer functions 216 implement effective and notional cash pooling, and may automatically initiate transfers to master or pooling accounts based on pre-configured settings and without value date losses for the corporations 102-110, and may calculate fees and interest based on consolidated account balances. The overdraft protection functions 218 may implement a security mechanism to avoid unplanned account balances, delay payment execution, re-route payments to different account or initiate automatic funding of accounts. The cost and liquidity account routing functions 220 may implement automatic planning of the routing of payments through the best suitable account during liquidity forecasting. The liquidity account routing functions 220 may find the best suitable account for any action proposal by applying the total cost of transaction (TCT) principle, by analyzing pre-defined corporate criteria, or in other ways.

Within the direct access to financial institutions functions 206 exist: direct money market access functions 222, foreign exchange (FOREX) trading platform functions 224, and hedging tools and strategies functions 226. The money market access functions 222 may implement one-click access for the corporations 102-110 to investments and funding instruments on the money market, for example, to alleviate excessive cash or mitigate short-term liquidity shortages. The FOREX trading platform functions 226 may implement, for the corporations 102-110, access to foreign currency trading services. The hedging tools and strategies functions 226 may implement direct access to hedging products to mitigate commodity, interest or foreign exchange risks, including market research, portfolio monitoring and reporting facilities.

Figure 3:
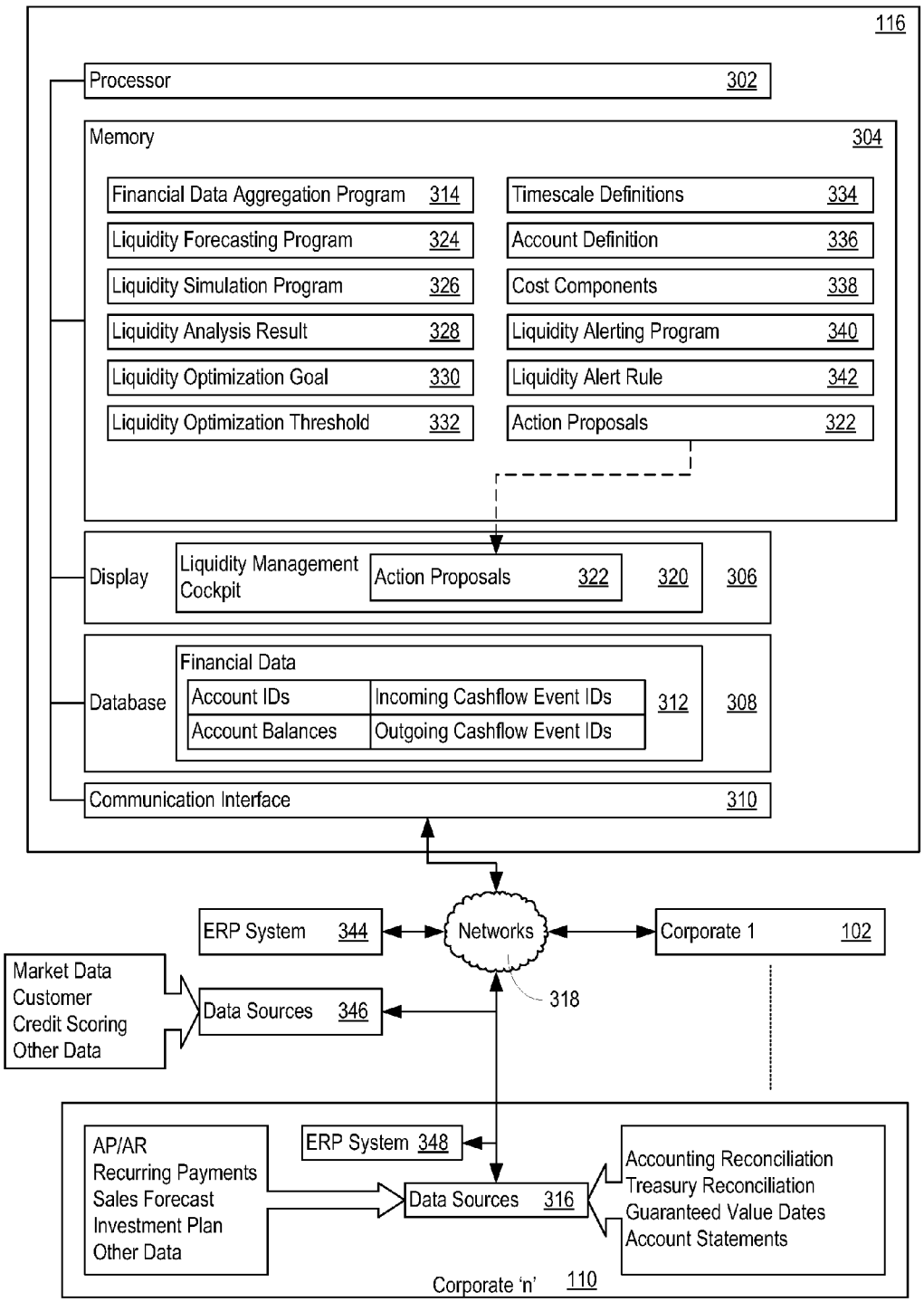
FIG. 3 shows a corporate payment, liquidity, and cash management optimization service platform that implements modular services, such as a treasury and portfolio management service.

FIG. 3 shows an implementation of the service platform 116. The service platform 116 includes a processor 302, memory 304, and a display 306. The service platform 116 also includes a database 308, and a communication interface 310. The memory 304 stores logic and data for execution and access by the processor 302. The logic may take the form of processor executable instructions (e.g., computer programs) that, when executed, cause the processor 302 to perform any of the modular services 118-122 in place at the bank 114. In particular, as described in more detail below, the logic may implement liquidity forecasting, simulation, and alerting, as well as any of the other functions in the treasury and portfolio management service 200.

The database 308 stores financial data 312 for analysis by the processor 302. The financial data 312 may include any financial portfolio data, including, as examples, account identifiers, account balances, incoming cashflow event identifiers, outgoing cashflow event identifiers, the names and institutions at which accounts are held, the types of accounts, limitations on purchases, sales, or other actions on the accounts, account characteristics (such as whether an account is poolable), interest rates, margin rates, historical balance information, or any other information. The financial data aggregation program 314 may obtain any of the financial data 312 at any desired interval. For example, the financial data aggregation program 314 may obtain (and store in the database 308) the financial data 312 on a real-time basis, as any change happens in any account, on an event-driven basis as pre-specified events occur (e.g., interest is deposited, or a balance transfer completes), or at any desired interval or schedule (e.g., every hour on weekdays). Because the platform 116 is hosted in the bank 114, the financial data aggregation program 314 may be able to obtain such data as the bank 114 itself executes, recognizes, registers, or completes changes to the accounts.

While the financial data 312 may originate with the bank 114, the financial data aggregation program 314 may obtain the financial data 312 from other data sources 316, 346 over the networks 318. The data sources 316, 346 (or the bank 114) may provide, as examples, unpaid vendor or customer invoice data, customer credit scoring data, accounts payable (AP) and receivable data (AR), recurring payment data, sales forecast data, and investment plan data. The data sources 316, 348 may be internal or external to the corporates 102-110. As examples, the external data source 346 may be a source of market financial data or customer credit scoring data, while the internal data source 316 may provide corporate sales forecast data to the service platform 116. The financial data 312 may also include account reconciliation data, treasury reconciliation data, guaranteed value dates, account statements, or other data.

The networks 112, 124, 318 may adhere to a wide variety of network topologies and technologies. For example, the networks 112, 124, 318 may include Ethernet and Fiber Distributed Data Interconnect (FDDI) packet switched networks communicating Transmission Control Protocol/Internet Protocol (TCP/IP) packets, or any other communication protocol data. Thus, the networks 112, 124, 318 represent a transport mechanism or interconnection of multiple transport mechanisms for data exchange between the corporations 102-110, the banks 114, 125, 128, 130, the ERP systems 344, 348, and the data sources 316, 346.

The processor 302 may generate a liquidity management cockpit 320 that provides a user interface through which an operator interacts with the service platform 116. For example, the liquidity management cockpit 320 may display, as described in more detail below, action proposals 322 for managing liquidity, liquidity forecasts, simulations, alerts, or any other information. The liquidity management cockpit 320 facilitates monitoring of liquidity peaks and shortages, simulates optimization of cash flows (e.g., based on the TCT), and allows import or export of simulation data from or to an Enterprise Resource Planning (ERP) system. Through the liquidity management cockpit 320, the corporations 102-110 have a reporting and management user interface for short-term, mid-term and long-term liquidity forecast for the complete set of accounts and portfolios, for account pools and for single accounts.

In the memory 304, a liquidity forecasting program 322 and liquidity simulation program 326 help to generate the action proposals as described in more detail below, as well as generate the graphs, charts, displays, and information shown in the liquidity management cockpit 320. The liquidity forecasting program 324 and liquidity simulation program 326 may determine an optimized account connection for carrying out action proposals using, for example, the total cost of transaction principle; may simulate changes to liquidity positions based on changes in execution dates of payments and recurring payments and sales forecasts, and short term investments and funding options; may initiate or generate action proposals for short term-investments or funding (e.g., self-dependent funding through the direct money market access functions 222 or based on the automated liquidity shortage alerting functions 212; and may also update the ERP systems 344, 348 with data out of the planning simulations (e.g., account information in the action proposals, or other data).

The memory 304 stores additional data and parameters in support of the treasury and portfolio management service 200. For instance, the liquidity forecasting program 324 determines liquidity analysis results 328 reflecting expected liquidity, and the liquidity simulation program 326 may optimize any liquidity analysis result 328 to try to move it toward a pre-defined or user specified liquidity optimization goal 330. One example of a liquidity optimization goal is to keep liquidity above a liquidity floor, or below a liquidity ceiling. Another example is to keep liquidity both between the liquidity floor and the liquidity ceiling, in a liquidity window over any specified time period.

The memory 304 may store a liquidity optimization threshold 332 that defines how close to the liquidity optimization goal 330 is sufficient for the purposes of optimization. The liquidity optimization threshold 332 may be expressed in any desired way. Examples include a maximum absolute or percentage deviation from a liquidity position at a certain time, a maximum deviation that changes on specified days or weeks, or in other ways.

The timescale definitions 334 may define a time period over which the liquidity forecasting program 324 predicts liquidity. The account definitions 336 may determine account characteristics, such as which accounts are poolable, limitations on actions that may be taken on the accounts (e.g., buy/sell timing restrictions), limitations on the account or action proposals 322 (e.g., only mutual funds may be purchased, no investments exceeding a specified number of days may be purchased, whether overdrafts are ever allowed, or what percentage of assets may be held at any particular financial institution), or other account characteristics for consideration by the liquidity forecasting program 324 and liquidity simulation program 326. The cost components 338 define one or more costs that contribute to a total transaction cost for taking an action on an account.

Furthermore, the liquidity alerting program 340 may determine when actual or predicted liquidity positions meet specified criteria. The liquidity alert rules 342 may define the criteria for processing by the liquidity alerting program 340. Examples of liquidity alerting rules 342 are: trigger an alert when predicted liquidity falls below a specified dollar amount on any day of the month; trigger an alert when predicted or actual liquidity exceeds a specified dollar amount; or generate a satisfactory-status alert once a day on every day that liquidity remains between a specified upper bound and lower bound. The service platform 116 may execute the alerts by displaying them in the liquidity management cockpit 320, by sending an alert message to a corporation 102-110, or in other ways.

The platform 116 is adept at financial portfolio optimization. In that regard, the financial data aggregation program 314 obtains and stores in the database 308 financial data 312 for a financial portfolio. The financial data 312 may include account identifiers, account balances, incoming cash-flow event identifiers, outgoing cash-flow event identifiers, and other financial data as noted above. The event identifiers in particular may identify when incoming cashflow events (e.g., interest payments or regularly invoice payments) are scheduled to occur and when outgoing cashflow events (e.g., accounts payable payments) are scheduled to occur. The event identifiers thereby assist the liquidity forecasting program 324 and liquidity simulation program 326 to accurately determine future liquidity positions, as reflected in the liquidity analysis results 328. As additional example, the incoming cashflow event identifiers and outgoing cashflow event identifiers may define aggregated future cash flows for accounts in the financial portfolio.

The processor 302 executes the liquidity forecasting program 324 on the financial data 312 to determine the liquidity analysis results 328. The liquidity analysis results 328 may be expressed, for example, as a predicted cash position over a time period for the financial portfolio. The processor 302 also executes the liquidity simulation program 326 on the liquidity analysis results 328 and the financial data 312 to determine one or more action proposals 322. The liquidity simulation program 326 generates the action proposals 322 to move the liquidity analysis results 328 toward the liquidity optimization goal 330. The processor 302 stores the action proposals 322 in memory 304 and may display them in the liquidity management cockpit 320, along with the liquidity analysis results 328, liquidity alerts, or other information.

The processor 302 may iteratively execute the liquidity simulation program 326 to repeatedly generated updated liquidity analysis results 328. In one implementation, the processor 302 applies the action proposals 322 as feedback into the liquidity simulation program 326 (e.g., by testing what happens if an action proposal 322 is accepted or rejected) to generate additional action proposals 322. The processor 302 may continue the iteration as many times as desired, for example, until the liquidity analysis results 328 move within the liquidity optimization threshold 332 of the liquidity optimization goal 330.

As one specific example of iterative execution, the liquidity simulation program 326 may select, for the accounts with overdraft or excess balance, an optimization scenario. The optimization scenario may be, as examples, a payment routing scenario for at least one of the accounts, a fixed term investment action for at least one of the accounts, or other scenario. The liquidity simulation program 326 may then apply a selected optimization scenario to determine an updated liquidity analysis result 328. The updated liquidity analysis result 328 may include a recalculation of expected deposit originated gains and losses after applying the optimization scenario, or a recalculation of any other financial aspects that bear upon the liquidity analysis results. The liquidity simulation program 326 may iteratively execute choosing and applying optimization scenarios any predetermined number of times before recalculating.

In addition, the processor 302 may communicate any of the action proposals 322 to an enterprise resource planning (ERP) systems 344, 348 for automatic execution. In particular, the processor 302 may communicate to the ERP systems 344, 348 the action proposals 322 that, with lowest cost, move the liquidity position toward the liquidity optimization goal 330. The ERP system is often part of the corporate entity (e.g., the ERP system 348), but may also be hosted by a third party external to the corporate entity (e.g., the ERP system 344)

Within the financial data 312, any financial portfolio may include one or more accounts. An account may be a master account into which any of the multiple accounts may be pooled to reduce fees, increase interest, expand investment opportunities, or attain other financial goals. As noted above, the account definitions 336 (among other characteristics) may identify which of the multiple accounts are poolable accounts and which are not poolable accounts.

Cash pooling may be used to concentrate cash into a master account, either virtually or actually in order to achieve gains on interest or fees, or to leverage short term investment opportunities. The account definitions 336 may define cash pooling parameters for acceptable cash pooling. As examples, the cash pooling parameters may define the frequency of cash pooling, define which accounts may be pooled, whether accounts may be automatically pooled, and the type of cash pooling. Types of cash pooling that the platform 116 may consider include effective cash pooling, in which the corporations 102-110 concentrate their cash positions by actually transferring cash without value date losses; and notional cash pooling, in which account balances are virtually pooled for the calculation of interest and fees.

The action proposals 322 may vary widely in scope and recommendation. As examples, the action proposals 322 may include: changing the execution date of an outgoing payment or changing the execution date of an incoming payment. As additional examples, the action proposals 322 may include: an investment purchase proposal to reduce excess cash, an investment sale proposal to generate cash, or a recommendation for routing of assets, payments, or both between accounts in the financial portfolio.

The liquidity forecasting program 324 and liquidity simulation program 326 consider, in determining the action proposals 322, the cost components 338 for financial transactions that may be included in the action proposals 322. More specifically, the liquidity simulation program 326 and liquidity forecasting program 324 may determine a total transaction cost using the cost components in their determination of whether the action proposal 322 moves the liquidity analysis results 328 toward the liquidity optimization goal 330. Examples of such cost components 338 include transaction fees, foreign currency fees, debit interest, and credit interest. Other examples of cost components 338 include discount costs, opportunity costs, tax costs, expected appreciation and depreciation, and other costs.

The total transaction cost analysis (or other cost analysis) may inform the platform 116 in providing an automatic control mechanism for daily liquidity management to manage deviations between actual and planned account balances. The platform 116 may then make action proposals 322 for alternative account connections and execution dates (e.g., of payments), based on liquidity or total cost of transaction analysis. Automatic account routing, including the transfer of monies between accounts, may be initiated during execution of the liquidity forecasting program 324 or liquidity simulation program 326. Automatic account routing may also be initiated in response to overdraft protection functions, particularly if the overdraft functions show deviations from the desired liquidity optimization goals 330.

With regard to the overdraft functions 218, the platform 116 may implement a mechanism avoid unplanned account balances, delay payment execution, re-route payments to different account or initiate automatic funding of accounts. The platform 116 may execute overdraft protection as a security mechanism initiated in the following cases, as examples: If an account balance would go negative after the execution of a payment or if the account balance deviates from the planned account balance in the liquidity forecast after processing a payment. The platform 116 may do balance calculation either on real-time account information or on forecasted account balances, and considering, for example, incoming notifications for high value payments. The platform 116 may request confirmation of the execution of the payment, to queue a payment until a certain time has been reached, to fund an account or to initiate an account re-routing. Funding of an account may involve funding through the money market, FOREX trading, receivable financing or transfers or lending between corporate accounts. Furthermore, when automated liquidity shortage alerts are defined in the alert rules 342, the platform 116 will provide automated action proposals 322 on funding alternatives and possibilities.

As noted above, the processor 302 executes the liquidity alerting program 340 on the liquidity alert rules 342 to determine when to generate a liquidity alert. As one example, a liquidity alert rule 342 may define a liquidity shortage. The liquidity alerting program 340 may then, in response to the liquidity alert, generating an action proposal 322 (e.g., a funding proposal for an account) to alleviate the liquidity shortage. Additional examples of action proposals 322 include: purchasing or selling money market assets through a money market access portal, and recommending to balance currency positions in the financial portfolio by buying foreign currency (e.g., EUR) with a first account in the financial portfolio with an excess balance of a first currency type (e.g., USD), and transferring the foreign currency to a second account in the financial portfolio that is short in liquidity in the foreign currency.

The time period over which the liquidity forecasting program 324 and liquidity simulation programs 326 operate may be defined by the timescale definitions 334. For example, the timescale definitions may represent a short term timescale definition (e.g., one week), a mid term timescale definition (e.g., one month), and a long term timescale definition (e.g., one quarter or one year). The liquidity analysis results 328 on any of the timescales may include a cash flow overview for one or more accounts in the financial portfolio, and may identify past and future cash-flows by time, account, currency, and amount. Furthermore, the liquidity forecasting program 324 or liquidity simulation program 326 may calculate expected deposit originated gains and losses. Such gains and losses may include expected interest earned or interest owed.

Whenever any liquidity analysis result 328 for an account or account pool, regardless of timescale, reveals excess cash, the liquidity forecasting program 324 or liquidity simulation program 326 may responsively generate action proposals 322. The action proposals 322 may be generated in an attempt to reach the liquidity optimization goal 330. The action proposals 322 may take the form of automated investment proposals and may be sent to the corporations 102-110 for review and consideration, may be automatically executed, or may be stored for future analysis, as examples. The action proposals 322 may specify the amount that may be invested per account or account pool, and the respective timeframes. The action proposals 322 may further take into consideration cross-account investment and funding needs, such as by moving Euros from an account with excess cash to a U.S. dollars in an account that is low on cash. The action proposals 322 may further specify risk assessments, interest rates, and the various financial instruments to consider when taking action. The platform 116 may further be configured to allow the corporations 102-110 to choose between action proposals 322, or to directly execute the proposals 322 through the money market access functions or with the ERP systems 344, 348.

Figure 4:
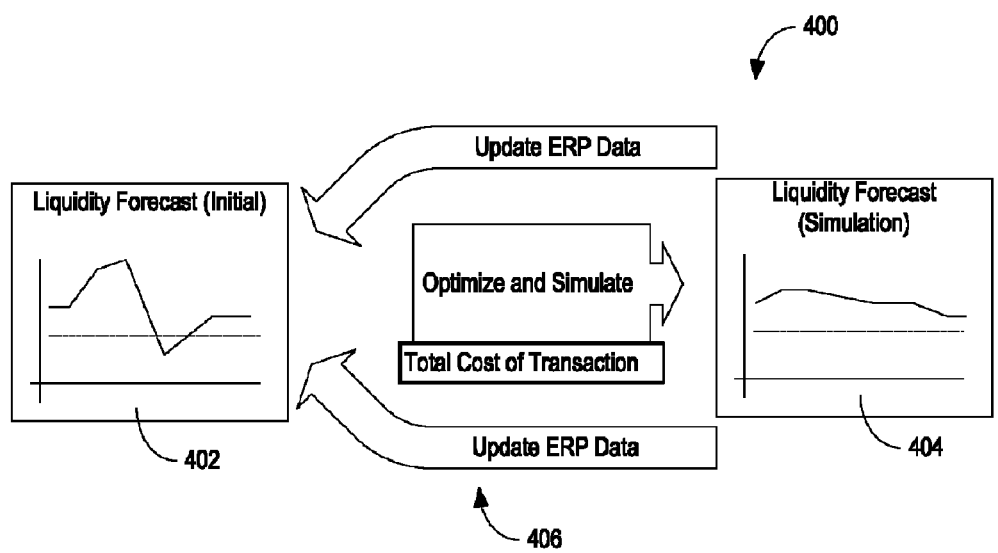
FIG. 4 shows a liquidity management cockpit user interface view of liquidity optimization and simulation.

FIG. 4 shows a view 400 of the liquidity management cockpit 320. The liquidity management cockpit 320 may display, for example, the initial liquidity forecast 402 determined by the liquidity forecasting program 324. The liquidity simulation program 326 may then optimize and simulate the effects of various action proposals 322, given the total cost of the those transactions, and trying to reach the liquidity optimization goals 330. As a result, the liquidity simulation program 326 generates results such as liquidity forecasts 404 and action proposals 322. Any of the results may be fed back 406 to the ERP systems 344, 348 or the liquidity forecasting program 324 for iterative analysis.

Figure 5:
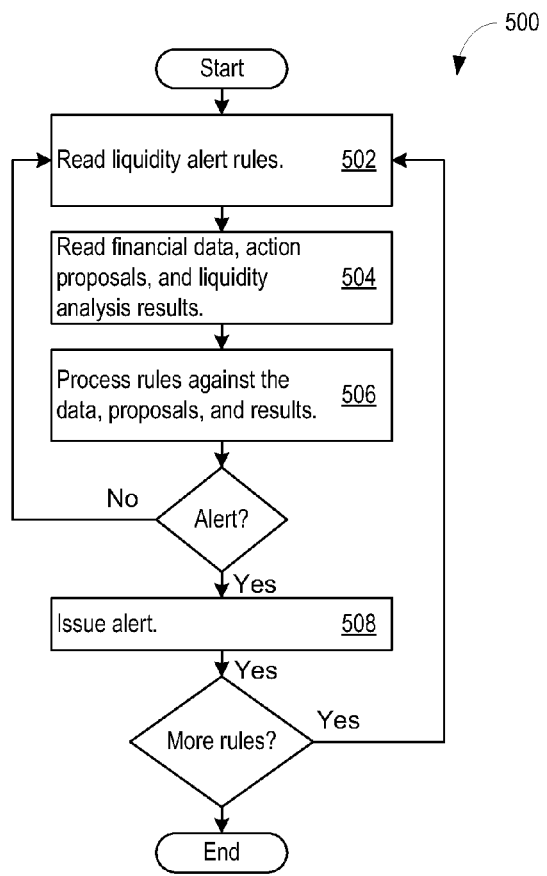
FIG. 5 shows liquidity alert logic.

FIG. 5 shows logic 500 that the liquidity alerting program 340 may implement. The liquidity alerting program 340 reads the liquidity alert rules 342 (502). The liquidity alerting program 340 also reads the financial data 312, action proposals 322, and the liquidity analysis results 328 (504). The liquidity alerting program 340 processes the liquidity alert rules 342 against the financial data 312, action proposals 322, and the liquidity analysis results 328 (506). When the liquidity alerting program 340 determines that a rule should fire, the liquidity alerting program 340 issues an alert (508), and continues reading the liquidity alert rules 342 until no more liquidity alert rules 342 need to be checked.

Figure 6:
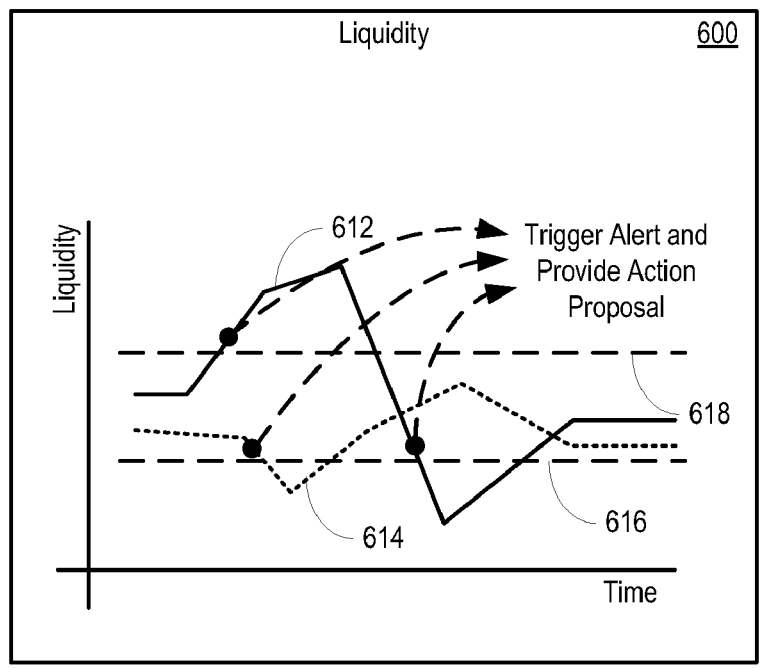
FIG. 6 shows a liquidity alerting analysis.

FIG. 6 shows a liquidity alerting analysis 600. The liquidity alerting analysis 600 includes both an actual liquidity position 612 and a forecasted liquidity position 614. The liquidity alert rule 616 establishes an alert for when the actual liquidity position 612 or forecasted liquidity position 614 drops to within a threshold of a minimum liquidity target. In executing the alert, the liquidity alerting program 340 may issue a liquidity alert, generate action proposals to fund the account, or take other actions. A similar liquidity alert rule 618 may be put in place to generate an alert or action proposal when too much actual or predicted liquidity exists.

Figure 7:
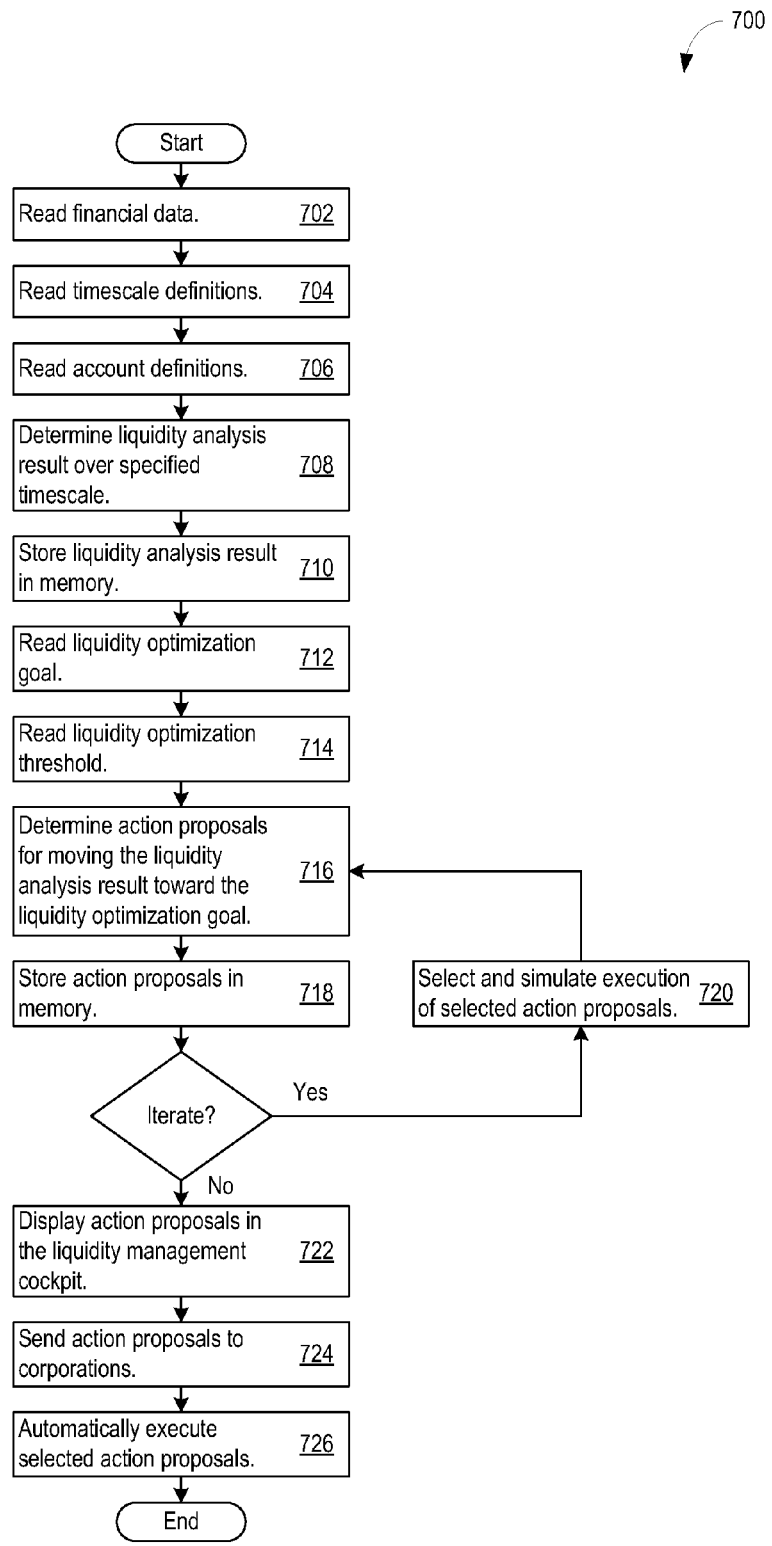
FIG. 7 shows platform logic for liquidity forecasting and simulation.

FIG. 7 shows logic 700 that the liquidity forecasting program 324 and liquidity simulation programs 326 may implement. In particular, the liquidity forecasting program 324 reads the financial data 312 (702), including account identifiers, account balances, incoming cash-flow event identifiers, and outgoing cash-flow event identifiers. The liquidity forecasting program 324 also reads the timescale definitions (704) and the account definitions (706) to further determine the parameters applicable to the liquidity analysis. The processor 302 executes the liquidity forecasting program 324 to determine a liquidity analysis result (708) over any specified timescale. The liquidity analysis result may specify a predicted cash position over the timescale for any account or multiple accounts in financial portfolio. The liquidity forecasting program 324 stores the liquidity analysis result in memory for access by the liquidity simulation program 326 (710).

The liquidity simulation program 326 reads the liquidity optimization goal 330 (712), and liquidity optimization threshold 332 (714). The processor 302 executes the liquidity simulation program 326 on the liquidity analysis result and the financial data 321 to determine an action proposal 322 that moves the liquidity analysis result 328 toward the liquidity optimization goal 330 (716).

The liquidity simulation program 326 stores the action proposals 322 in the memory 304 (718). The liquidity simulation program 326 may iterate as many times as desired. In each iteration, for example, the liquidity simulation program 326 may select one or more action proposals and simulate execution of any of the selected action proposals to measure the effect of the selected action proposals to determine an updated liquidity analysis result (720). Updated liquidity analysis results may be employed in each iteration for as long as desired to move the predicted liquidity analysis result toward the liquidity analysis goal 330.

When iteration is complete, the liquidity simulation program 326 may proceed in several different ways. For example, the liquidity simulation program 326 may display the action proposals in the liquidity management cockpit (722). As another example, the liquidity simulation program 326 may send any of the action proposals to the client corporation for review and decision (724). The client corporation may then communicate an execution decision on any of the action proposals to the platform 116 for responsive execution. As yet another example, the liquidity simulation program 326 may initiate automatic execution of any suitable action proposal (726). To that end, the liquidity simulation program 326 may send any selected action proposal to the ERP systems 344, 348 (or other system) for automatic execution.

The platform 116, in support of the direct money market access functions 222, may implement direct money market access to the corporations 102-110 through a web portal or other interface. The portal may provide a single point of access to money market relevant information, such as: possible financial instruments and underlying conditions, market research & analyst ratings, and portfolio overviews. The portal may further facilitate execution of financial transactions at real-time market prices.

The direct money market access functions 222 provide the ability for the corporations 102-110 to invest excessive money or fund cash needs according to the liquidity analysis results 328 or as suggested by the action proposals 322. The direct money market access functions 222 may further initiate short-term investments for cash positions on a master account where cash pooling has been effective.

With regard to the FOREX trading platform functions 224, the liquidity analysis results 328 may provide an overview of the development of cash positions in different currencies. The overviews may include the actual balance of an account (in a certain currency) and planned cash flows for the account, as well as the aggregated balance of all accounts in one currency of an organizational unit and planned cash flows. If a liquidity shortage alert fires, the platform 116 may communicate to the corporations 102-110 a notification if the (predicted) balance of an account or account pool reaches a certain limit. As one option, the corporations 102-110 may choose to fund the account by buying foreign currency with an account with excessive balance (e.g., in EUR) and transferring this money to the account short in liquidity (e.g., in USD). The FOREX trading platform functions 224 may provide central access to initiate the funding or to buy or sell foreign currency.

A web portal or other interface may offer to the corporations 102-110 the hedging tool and strategies functions 226. The hedging tools and strategies functions 226 help mitigate foreign currency risks, interest risks, and commodity risks. In addition, the hedging tools and strategies functions 226 may provide a single point of access to any desired hedging instruments, including information on conditions and research on market trends. Such hedging instruments may include put & call options and caps and floors, or other instruments. The hedging tools and strategies functions 226 may further facilitate execution of one-click-hedging transactions at real-time market prices, provide an overview of executed transactions and monitor and report on accounts in the financial portfolio, in addition to or instead of the direct money market access functions 222.

The platform 116, the treasury and portfolio management service 200, and the logic and programs 314, 324, 326, and 340 within the platform 116 may be implemented with a wide range of available technologies and may also be custom developed. Examples of such technologies include Oracle™ and SAP™ databases, e-business suites, ERP, direct billing, and performance management applications. Additional examples include Kyriba™ treasury and cash management solutions and bank connectivity hubs, Sungard™ software and processing solutions for financial services, and Wallstreet Systems™ treasury and asset management suites, backoffice platform, trade processing solutions, or hosted treasury management solutions. FUNDTech™, Alnova™, Bottomline Technologies™, or Misys™ products and services for cash management and payment and high performance banking may also be employed in the platform 116. Avolent™, BasWare™, or Xign™ electronic billing or ePayables solutions may also be employed in the platform 116.

The platform 116 helps to alleviate difficult pain points for the corporations 102-110. These pain points include, for many corporations, underdeveloped liquidity management capabilities, lack of integrated overviews of payments, cash positions, and liquidity forecasts, cash consolidation limited to a single bank or single currency, excessive sleeping working capital, and debt interest and fees resulting from suboptimal use of working capital. Part of the value delivered by the platform 116 to the corporations 102-110 includes enhanced cash visibility, with a consolidated overview of cash positions and functions for cash concentration over different banks and currencies, as well as locating excessive or sleeping cash and optimizing return on working capital. The value delivered also extends to optimized liquidity planning and return on working capital, which may take into consideration opportunity costs, interest and transaction costs and discounts in payments and liquidity planning, and also the functionality to simulate liquidity planning with automated actions taken in the ERP systems 344, 348. Further benefits include automatic control mechanisms for detecting deviations in liquidity from a predefined plan, as well as single point access to financial markets, thereby providing an enhanced overview of risks positions and easy access to money market and hedging instruments.

The platform 116 also provides benefits to the bank. The benefits include new sources of revenue. For example, the banks may act as "first movers" to increase market share by attracting new corporate customers who may not be able to afford their own treasury software and treasury department. As additional examples, the banks may experience increased customer retention and add sources of revenue by providing additional services, as well as experience greater customer penetration through up- and cross-selling possibilities.

The platform 116 or any of the systems described above may be implemented with additional, different, or fewer components. As one example, a processor may be implemented as a microprocessor, a microcontroller, a Digital Signal Processor (DSP), an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms.

Logic, such as programs or circuitry, may be combined or split among multiple programs, distributed across several memories and processors, and may be implemented in a library, such as a shared library (e.g., a dynamic link library (DLL)). The DLL, for example, may store code that performs liquidity forecasting or simulation. As another example, the DLL may itself provide all or some of the functionality of the platform 116. The programs may be stored on a computer readable medium, such as a CDROM, hard drive, floppy disk, flash memory, or other computer readable medium. Thus, a computer program product may include computer readable instructions, which when loaded and run in a computer and/or computer network system, cause the computer system and/or the computer network system to perform operations according to any of the claims below, and in particular to perform any of the logic and methods illustrated in the figures.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for financial portfolio optimization, the method comprising:
   providing a processor and a memory in communication with the processor;
   storing in the memory:
      a liquidity forecasting program;
      a financial data aggregation program operable to obtain and store in the memory financial data for a financial portfolio, the financial data comprising account identifiers, account balances, incoming cash-flow event identifiers, and outgoing cash-flow event identifiers;
   executing the liquidity forecasting program with the processor on the financial data to:
      determine a liquidity analysis result comprising a predicted cash position over a time period for the financial portfolio; and
      store the liquidity analysis result in the memory;
   storing in the memory:
      a liquidity simulation program; and
      a liquidity optimization goal; and
   executing the liquidity simulation program with the processor on the liquidity analysis result and the financial data to:
      determine an action proposal that moves the liquidity analysis result toward the liquidity optimization goal;
      store the action proposal in memory; and
      display the action proposal.

2. The method of claim 1, further comprising:
   storing in the memory a liquidity optimization threshold; and
   where executing comprises:
   iteratively executing the liquidity simulation program, using the action proposal as feedback into the liquidity simulation program, until the liquidity analysis result moves within the liquidity optimization threshold of the liquidity optimization goal.

3. The method of claim 1, further comprising:
   communicating the action proposal to an enterprise resource planning system for automatic execution.

4. The method of claim 1, where:
   the financial portfolio comprises multiple accounts, including a master account into which any of the multiple accounts may be pooled.

5. The method of claim 1, where:
   the action proposal comprises:
      a change in execution date of an outgoing payment;
      a change in execution date of an incoming payment;
      an investment purchase proposal for excess cash;
      an investment sale proposal to generate cash;
      routing of assets, payments, or both between accounts in the financial portfolio;
      or any combination thereof.

6. The method of claim 1, further comprising:
   storing in the memory:
      cost components for financial transactions that the liquidity simulation program considers in determining the action proposal.

7. The method of claim 6, where:
   the liquidity simulation program determines a total transaction cost over the cost components in its determination of whether the action proposal moves the liquidity analysis result toward the liquidity optimization goal.

8. The method of claim 1, further comprising:
   storing in the memory:
      a liquidity alert rule; and
      a liquidity alerting program; and
   executing with the processor the liquidity alerting program on the liquidity alert rule to determine when to communicate a liquidity alert.

9. The method of claim 8, where:
   the liquidity alert rule defines a liquidity shortage; and
   further comprising:
   in response to the liquidity alert, generating a funding proposal to alleviate the liquidity shortage.

10. The method of claim 1, where the action proposal comprises:
    purchasing or selling money market assets through a money market access portal.

11. The method of claim 1, where the action proposal comprises:
    recommending to balance currency positions in the financial portfolio by buying foreign currency with a first account in the financial portfolio with an excess balance of a first currency type, and transferring the foreign currency to a second account in the financial portfolio that is short in liquidity in the foreign currency.

12. The method of claim 1, where the liquidity analysis result comprises:
    a cash flow overview for an account in the financial portfolio.

13. A product comprising:
    a machine readable medium; and
    logic stored on the medium that, when executed by a processor, causes the processor to:

store in a memory:
   a liquidity forecasting program; and
   a financial data aggregation program operable to obtain and store in the memory financial data for a financial portfolio, the financial data comprising account identifiers, account balances, incoming cash-flow event identifiers, and outgoing cash-flow event identifiers;
execute the liquidity forecasting program with the processor on the financial data to:
   determine a liquidity analysis result comprising a predicted cash position over a time period for the financial portfolio; and
   store the liquidity analysis result in the memory;
store in the memory:
   a liquidity simulation program; and
   a liquidity optimization goal; and
execute the liquidity simulation program with the processor on the liquidity analysis result and the financial data to:
   determine an action proposal that moves the liquidity analysis result toward the liquidity optimization goal;
   store the action proposal in memory; and
   display the action proposal.

14. The product of claim 13, where the logic, when executed, further causes the processor to:
store in the memory a liquidity optimization threshold; and
iteratively execute the liquidity simulation program, using the action proposal as feedback into the liquidity simulation program, until the liquidity analysis result moves within the liquidity optimization threshold of the liquidity optimization goal.

15. The product of claim 13, where the logic, when executed, further causes the processor to:
communicate the action proposal to an enterprise resource planning system for automatic execution.

16. The product of claim 13, where:
the financial portfolio comprises multiple accounts, including a master account into which any of the multiple accounts may be pooled.

17. The product of claim 13, where:
the action proposal comprises:
   a change in execution date of an outgoing payment;
   a change in execution date of an incoming payment;
   an investment purchase proposal for excess cash;
   an investment sale proposal to generate cash;
   routing of assets, payments, or both between accounts in the financial portfolio;
   or any combination thereof.

18. The product of claim 13, where the logic, when executed, further causes the processor to:
store in the memory:
   cost components for financial transactions that the liquidity simulation program considers in determining the action proposal.

19. The product of claim 18, where:
the liquidity simulation program determines a total transaction cost over the cost components in its determination of whether the action proposal moves the liquidity analysis result toward the liquidity optimization goal.

20. The product of claim 13, where the logic, when executed, further causes the processor to:
store in the memory:
   a liquidity alert rule; and
   a liquidity alerting program; and
execute with the processor the liquidity alerting program on the liquidity alert rule to determine when to communicate a liquidity alert.

21. The product of claim 20, where:
the liquidity alert rule defines a liquidity shortage; and
where the logic, in response to the liquidity alert, generates a funding proposal to alleviate the liquidity shortage.

22. The product of claim 13, where the action proposal comprises:
purchasing or selling money market assets through a money market access portal.

23. The product of claim 13, where the action proposal comprises:
recommending to balance currency positions in the financial portfolio by buying foreign currency with a first account in the financial portfolio with an excess balance of a first currency type, and transferring the foreign currency to a second account in the financial portfolio that is short in liquidity in the foreign currency.

24. The product of claim 13, where the liquidity analysis result comprises:
a cash flow overview for an account in the financial portfolio.

* * * * *